US012669920B2

(12) United States Patent
Chung et al.

(10) Patent No.: US 12,669,920 B2
(45) Date of Patent: Jun. 30, 2026

(54) SYSTEM AND GRAPHICAL USER INTERFACE FOR GUIDED NEW SPACE CREATION FOR A CONTENT COLLABORATION SYSTEM

(71) Applicants:Atlassian Pty Ltd., Sydney (AU); Atlassian US, Inc., San Francisco, CA (US)

(72) Inventors: Dong Jae Chung, San Francisco, CA (US); Jacob Brunson, San Francisco, CA (US); Julie Kuang, San Francisco, CA (US); Nicholas Bourlier, San Francisco, CA (US); Hye Lim Joun, San Diego, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/957,787

(22) Filed: Sep. 30, 2022

(65) Prior Publication Data

US 2024/0111399 A1 Apr. 4, 2024

(51) Int. Cl.
G06F 3/04842 (2022.01)
G06F 3/0482 (2013.01)
(Continued)

(52) U.S. Cl.
CPC ........ G06F 3/04842 (2013.01); G06F 3/0482 (2013.01); G06F 3/04847 (2013.01);
(Continued)

(58) Field of Classification Search
CPC .............. G06F 3/04842; G06F 3/0482; G06F 3/04847; G06F 21/31; G06F 40/137; G06F 40/14
See application file for complete search history.

(56) References Cited

U.S. PATENT DOCUMENTS 7,676,542 B2 *  3/2010  Moser .................. G06Q 10/107
                                                 709/204
8,296,653 B2 *  10/2012  Woolfe ................. G06F 3/1285
                                                 715/224
(Continued)

OTHER PUBLICATIONS

C. C. Wang and D. Xue, "Using domain ontology in a semantic blogging system for construction professionals," in Tsinghua Science and Technology, vol. 13, No. S1, pp. 279-285, Oct. 2008, doi: 10.1016/S1007-0214(08)70162-7. (Year: 2008).*

(Continued)

*Primary Examiner* — Matthew Ell
*Assistant Examiner* — Blaine T Basom
(74) *Attorney, Agent, or Firm* — Brownstein Hyatt Farber Schreck, LLP

(57) ABSTRACT

A computer-implemented method for creating a new document space for a content collaboration system is disclosed. The method includes displaying a space-generation graphical user interface on a client device. The space-generation graphical user interface is displayed in response to a request for a new document space creation, and includes a first user input region, a second user input region, and a space-creation control. The method includes, in response to a user selection of the space-creation control, generating the new document space having a set of predefined space settings determined in accordance with a user selection of a particular selectable tab associated with a particular new-space type, generating space content having a space title determined in accordance with a proposed space title in the second user input region; and generating a new space path using a unique space key. The unique space key is generated based on the proposed space title.

17 Claims, 11 Drawing Sheets

200b

(51) Int. Cl.

| | |
|---|---|
| *G06F 3/04847* | (2022.01) |
| *G06F 21/31* | (2013.01) |
| *G06F 40/137* | (2020.01) |
| *G06F 40/14* | (2020.01) |

(52) U.S. Cl.
CPC ............ *G06F 21/31* (2013.01); *G06F 40/137* (2020.01); *G06F 40/14* (2020.01)

(56) References Cited

U.S. PATENT DOCUMENTS

| | | | | |
|---|---|---|---|---|
| 9,454,592 | B2 * | 9/2016 | Mills ..................... | G06F 16/273 |
| 9,952,738 | B1 * | 4/2018 | Kumar .............. | G06Q 30/0261 |
| 10,108,613 | B2 * | 10/2018 | Spataro .................. | G06F 16/93 |
| 10,867,128 | B2 * | 12/2020 | Purandare ............ | G06F 40/197 |
| 2002/0149618 | A1 * | 10/2002 | Estrada ................. | G06Q 10/10 |
| | | | | 715/760 |
| 2007/0283278 | A1 * | 12/2007 | Hupfer ................ | H04L 65/4015 |
| | | | | 715/751 |
| 2013/0239054 | A1 * | 9/2013 | Toshima ............... | G06F 3/0482 |
| | | | | 715/811 |
| 2014/0359085 | A1 * | 12/2014 | Chen ..................... | H04L 63/102 |
| | | | | 709/220 |

OTHER PUBLICATIONS

Screen captures from YouTube video clip entitled "How to Create a SharePoint Communication Site," 11 pages, uploaded on Nov. 9, 2018 by user "Collaboration Coach". Retrieved from the Internet: < https://youtu.be/ds2eK6dNId4>. (Year: 2018).*

Zelfond, Gregory. "How to change the URL address of a SharePoint site," Oct. 27, 2020 [retrieved on Aug. 30, 2023]. Retrieved from the Internet: <URL: https://web.archive.org/web/20201101020300/https://sharepointmaven.com/how-to-change-the-url-address-of-a-sharepoint-site/>. (Year: 2020).*

* cited by examiner

500

CAUSE DISPLAY OF A SPACE-GENERATION
GRAPHICAL USER INTERFACE ~502

GENERATE A NEW DOCUMENT SPACE ~504

GENERATE SPACE CONTENT ~506

GENERATE A SPACE KEY UNIQUE FOR THE
NEW SPACE ~508

600

RECEIVE A REQUEST TO CREATE A NEW DOCUMENT SPACE ~602

DETERMINE A ROLE OF A USER ~604

CAUSE DISPLAY OF SPACE-GENERATION GRAPHICAL USER INTERFACE ~606

RECEIVE USER SELECTION OF A SPACE TYPE ~608

RECEIVE USER INPUT FOR ONE OR MORE ATTRIBUTES OF THE NEW DOCUMENT SPACE ~610

DISPLAY A PREVIEW IMAGE OF THE NEW DOCUMENT SPACE ~612

GENERATE THE NEW DOCUMENT SPACE ~614

700

702 — PROCESSING UNIT

704 — MEMORY

714

706 — INPUT DEVICE

708 — DISPLAY

710 — OUTPUT DEVICE

712 — POWER SOURCE

SYSTEM AND GRAPHICAL USER INTERFACE FOR GUIDED NEW SPACE CREATION FOR A CONTENT COLLABORATION SYSTEM

TECHNICAL FIELD

Embodiments described herein relate to remotely hosted software platforms and, in particular, to systems and methods for assisting in new space creation for a content collaboration system.

BACKGROUND

Electronic content and electronic documents may be used to share information across an organization by providing project documentation and knowledge base resources. However, the number of electronic documents and other user-generated content may be difficult to organize and access using some traditional data storage techniques. The systems and techniques described herein are directed to a system and graphical user interface for generating and customizing document spaces, which may be used to generate and organize user-generated content in a manner that enables more rapid discovery and access to system data. The proposed system may also result in a more efficient use of platform resources by creating a document space tailored to the expected use and created using a more streamlined set of operations.

SUMMARY

The embodiments and examples described herein are directed to computer systems and computer-implemented methods for creating a new document space, and generating content for pages in the new document space. As described herein, the system may include a backend configured to provide page content or other electronic content of a content collaboration platform over a computer network to a plurality of client devices. Each client device may be operating a web browser client application (or a frontend application) with a graphical user interface that is adapted for efficient creation and customization of new document spaces of a backend application of a content collaboration platform.

The embodiments described herein are directed to a computer implemented method of generating a graphical user interface for creating a new document space or workspace of a content collaboration system. The system may cause display of a space-generation graphical user interface on a client device operating a front-end application of the content collaboration system. The space-generation graphical user interface may be displayed in response to a request to create a new document space from the client device operating the front-end application. The space-generation graphical user interface may include a first user input region, a second user input region, a target image region, a key region, a space description region, and a space-creation control. The first user input region may include an array of a user-selectable tabs, and each user-selectable tab may correspond with a new-space type. The second user input region may include a title input field, which may be configured to receive a proposed space title. A target image region may depict a preview image corresponding to a new space. The preview image may be configured to change in response to a user selection of a selectable tab of the array of user-selectable tabs. The preview image may depict a preview of space content including the proposed space title.

The key region may depict a unique space key, which may be derived from the proposed space title. The space description region may be configured to change in response to the user selection of the selectable tab. In response to a user selection of the space-creation control, a backend application of the content collaboration system may be configured to generate the new document space having a set of predefined space settings. The set of predefined space settings may be determined in accordance with the user selection of a particular selectable tab associated with a particular new-space type. The backend application may be further configured to generate space content having a space title that is determined in accordance with the proposed space title, and generate a new space path using the unique space key. The new space path may be used by the frontend application to access the new document space.

Other embodiments for creating a new space for a content collaboration system are also described in the present disclosure.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
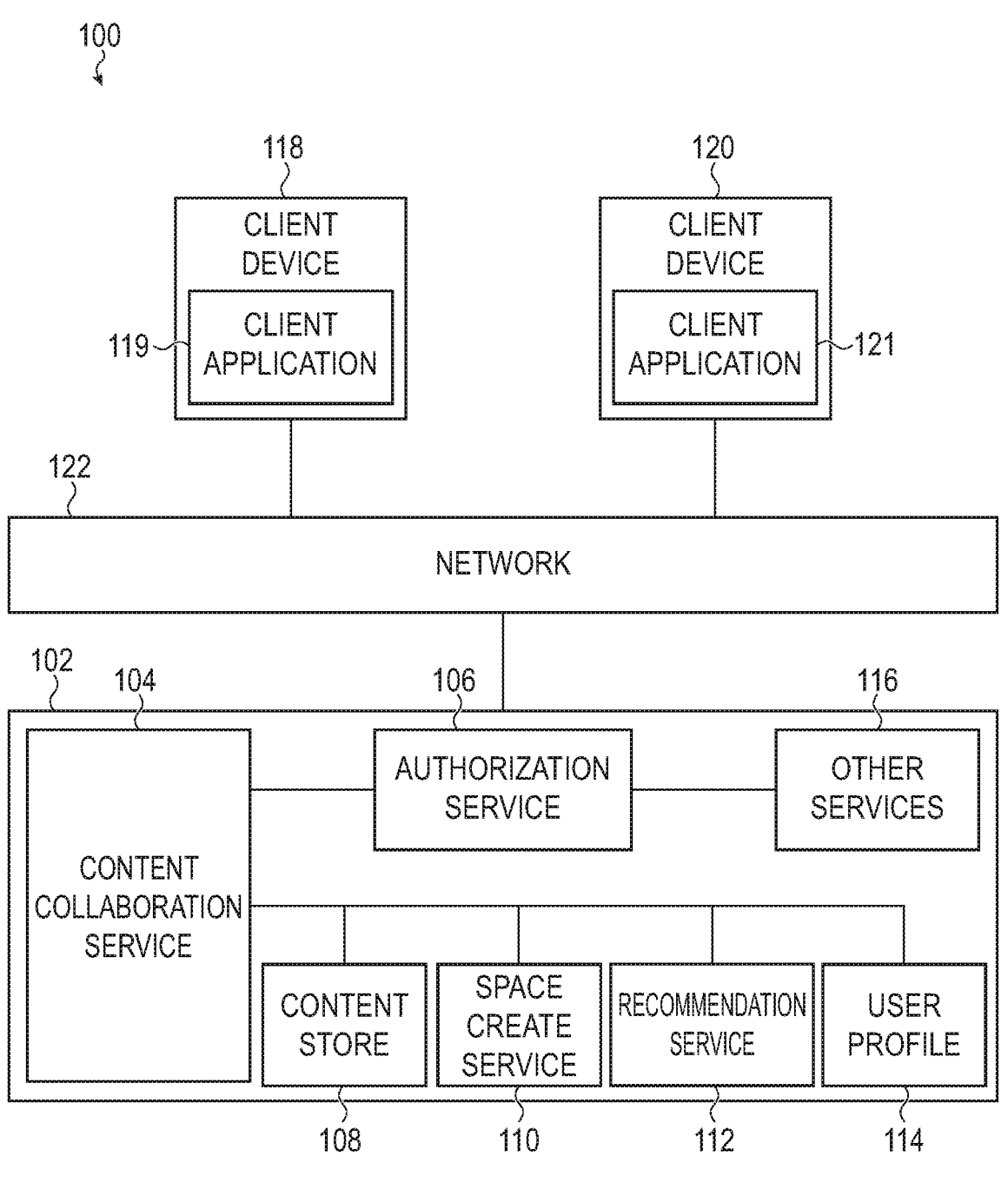
FIG. 1 depicts a content collaboration system for generating content for a user specified document space in accordance with the embodiments described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Generally, in a content collaboration platform or system, a document space or workspace may be used to define a virtual collaboration environment for a user or team. The document space may be used to organize and navigate user-generated content associated with a project, team, or initiative. Because document spaces can be widely configured for a broad range of use cases, they can be powerful organizational tools for creating content and presenting the content within an organization or across a tenant of the content collaboration platform. Through the use of various permissions schemes, content creation and electronic communication can be managed for a particular tenant while controlling dissemination of confidential information or other sensitive data that may be generated within a particular document space.

However, due to the large amount of variability in the configuration of any particular space for a given use case, it may be difficult or cumbersome to manually adapt each new document space. Additionally, due to the development of a relatively feature-rich platform, it can be difficult to both expose functionality to the user while maintaining a simple and intuitive interface. The systems and techniques described herein are directed to a frontend application or a user interface that can guide a user through a series of operations for creating and customizing a document space for a particular use case. As part of the graphical user interface, the user may be presented with a series of selections or controls, each associated with a different space type or configuration. As the user selects the various options, a target image graphic is modified in real time to preview the space content, format, file structure, and other aspects of the new document space. Furthermore, the system may present dynamically updated user-editable fields for space parameters like a space key, that can be used to generate a unique path to the new space. Through the use of such a space-generation user interface, a customized new space can be created that is well-tailored to a user's needs while reducing the number of interactions and potential iterations typically used to define and create a new document space.

The systems and techniques described herein can be used to create a new document space or workspace that is adapted for a particular use case or scenario. Specifically, the system may define multiple blueprints or default templates that may be customized through the user interface and designate a set of default space settings and document arrangement structures that are adapted for each user's needs. As described herein, the various default templates may correspond to what is referred to as a space type or space category. Each space type may correspond to a different hierarchical page structure, default page format, space home, team of users, permissions, and other programmable or configurable aspects of a document space.

The systems and techniques described herein may improve uniformity between similarly used document spaces by providing a default or recommended organizational structure, which may improve the predictability and usefulness of a set of spaces across a tenant or the platform by reducing space-to-space navigational difficulty that may develop by having too much diversity in content structure, particularly for spaces hosting similar categories of user-generated content. The systems and techniques may also promote content diversity within a given tenant or platform by exposing functionality and options through the simplified user interface.

Specifically, the embodiments described herein are directed to a graphical user interface that allows a user to select from a set of predefined space types using an array of controls. The set of predefined space types may include, without limitation, knowledge base space types, team space types, documentation space types, software project space types, project management space types, product or code development space types, and others. Each space type may have a corresponding default space content, space format, template page format and/or content, file or page tree structure, permissions, and other space configurable elements.

As the user selects one of the predefined space types, through selection of a tab, button, or other control, a space preview is dynamically generated in a target or representative image. A narrative explaining the various options and settings corresponding to the selected space type may be displayed below the target image. The user may also be prompted to enter space content through one or more dialogue boxes or use input regions and, as the user enters space content, the target or representative image is dynamically updated to reflect the user input and giving the user real-time feedback on the proposed space.

Furthermore, as a user enters text, the system may analyze the input and begin to define system data for the new space. In particular, the system may generate a space key in response to and based on the user input. As described herein, the space key may be used to uniquely identify the space path, and user-generated content created for the respective document space. The space key may be a part of a uniform resource locator (URL) address, and based on each space key being unique, each document space may be uniquely identified.

The set of controls for the different space types may be displayed to the user in a graphical user interface based on a respective ranking for each space type. The respective ranking for each space type may be determined based on many factors, including but not limited to, a user profile, a user setting, or a role associated with a user account of a user operating a frontend application of the client collaboration system on a client device. In some cases, the content types may be adapted based on a user profile, user setting, or role associated with the user account. The content type may also be adapted or modified in accordance with historical space use by the user of the user account or for a group of users associated with the tenant or operating entity. In this way, space blueprints or templates may be adapted over time to reflect the preferences and use history of the system users.

As described herein, when new document space is created based on a particular space type, a user may be guided through or provided information regarding a page structure and a particular format in which the content should be organized in a page for the given space type. Accordingly, corresponding to each space type, one or more pages (or template pages) may be displayed to a user that may guide the user or provide information regarding a page structure and particular format in which content should be organized in a page for the user-selected space type. The template pages may be static; in other words, the template pages corresponding to each space type may be predefined and stored in the content collaboration system.

Additionally, or alternatively, the template pages may be dynamically generated based on analysis of a plurality of pages created by a plurality of users for various user-created document spaces of a particular space type using one or more machine-learning algorithms. In some cases, the template pages may be dynamically generated based on one or more rules based on various aspects such as a user profile, a role of a user, a group profile, attributes of a project, a look-and-feel guideline that is based on a team, a location, and/or an organization, and so on.

Once a space is created, a space user interface is generated depicting the space home having the space content and default or prepopulated content in a user-editable region of a content panel. The space user interface may also include a navigational panel positioned adjacent to the content panel, which may include selectable elements for the various content contained within the space, including pages or documents arranged in a hierarchical element tree or page tree, blog entries, space calendar, and placeholders for archived entries, space analytics, questions, and other content. Each of these elements may be accessible in accordance with a set of permissions granted to an authenticated user. Further, each of these elements is selectable to cause display of the respective content in the content panel of the interface. In accordance with an authenticated user having edit permissions with respect to particular content being displayed, the interface may be used as a content editor to create, edit, or otherwise modify the content, which may be published to system users.

The content and structure of the space may depend on the space type selected by the user. For example, a hierarchical document tree of a document space that is based on a "team space" space type may display documents in a corresponding hierarchical document tree that are grouped and/or displayed based on team members, while a hierarchical document tree of a document space that is based on a "knowledge base space" space type may display documents in a corresponding hierarchical document tree that are grouped and/or displayed based on subject matter or research topics. Similarly, the content and structure of other portions of the space including blog entries, team members, calendars, and permission schemes by object or file, may be tailored in accordance with the designated space type.

These foregoing and other embodiments are discussed below with reference to FIGS. 1, 2A-2C, 3A-3B, 4A-4B, and 5-7. However, those skilled in the art will readily appreciate that the detailed description given herein with respect to these figures is for explanation only and should not be construed as limiting.

FIG. 1 depicts a simplified diagram of a system, as described herein. The system 100 is depicted as implemented in a client-server architecture or client-service architecture, but it may be appreciated that this is merely one example and that other communications architectures are also possible. In accordance with the examples provide herein, the system 100 of FIG. 1 can be used to provide a series of interfaces to a document management system, page management system, content collaboration system, or other electronic content management system via a computer network. The architecture of system 100 allows for remote access or creation of electronic content using either a dedicated client application (such as a web browser application, a mobile device application, or a native client application) to access backend servers, or a client application (such as a web browser application, a mobile device application, or a native client application) to access one or more web services offered by a backend system. As described herein, the system 100 may be used to create, manage, and display content for electronic pages or documents. Electronic pages or documents may be created for a particular document space, also referred to herein as a "workspace" or simply a "space."

The networked computer system or system 100 of FIG. 1 depicts an example configuration in which multiple client devices 118 and 120 may access hosted services 102 via a computer network 122. The computer network 122 may include a distributed network which may include local networks, gateways, and/or networking services provided by one or more internet service providers. The client devices 118 and 120 are able to create, search, view, and share content via the network 122 either directly or through the various services provided by the hosted services 102.

The client devices 118, 120 execute or operate respective example client applications 119, 121, which may include a dedicated client-side application or may be a web browser client application. The client applications 119, 121 may also be referred to herein as frontend applications, and may provide one or more graphical user interfaces for interfacing with backend applications or services provided by the hosted services 102. The client devices 118, 120 may include a display, a processing unit, a computer memory, and/or other hardware components. An example device, including hardware elements, is described below with respect to FIG. 7.

The hosted services 102 may include or provide multiple platform services, which may be part of a content collaboration system. For example, the multiple platform services may include, but are not limited to, a content collaboration service 104, a space creation service (or a document space creation service) 110, and other collaboration or data management services (or other services 116. The content collaboration service 104 may include one of a variety of different services or platforms including, without limitation, a page or document creation and management service or platform or a content wiki service or platform. The other services 116 may include one or more of a variety of different services including, for example, an issue tracking service or platform for creating, managing, and tracking issues for software development, bug tracking, and/or information technology service management (ITSM) services. The other services 116 may also include communication services including a video conferencing service or platform, a chat-based service or platform, direct messaging services, and the like. The other services 116 may also include interaction event tracking and management services or other services required by one or more of the services provided by the hosted services 102 and, in some cases, may be shared by one or more of the services or platforms.

The platforms or services of the hosted services 102 may be implemented as one or more instances of a backend application operating on, or executing on, one or more hardware or virtual machines that may use one or more physical or virtual computing resources (collectively referred in many cases as a "cloud platform"). In some cases, the platforms or services shown in the hosted services 102 may be executing on the same or different hardware or virtual machines, which may be physically collocated or positioned in geographically unique location(s).

The hosted services 102 may be communicably coupled to one or more client devices by a network 122. Multiple example client devices are shown as the client devices 118 and 120. The hosted services 102 may support infrastructure for one or more backend applications, each of which may be associated with a particular software platform, such as a content collaboration platform (e.g., a documentation or wiki platform) or other platform (e.g., an issue tracking platform). In the example of FIG. 1, the hosted services 102 host a content collaboration service 104, an authentication/authorization service 106, a space creation service 110 (or a document space creation service 110), and other services 116. The hosted services 102 may also include a recommendation service 112, and a user profile service 114. The hosted services 102 may also have a local cache of pages of user-generated content and/or data related to document spaces which may be incorporated with or supplied by the content store 108.

The content collaboration service 104 may provide an interface to one or more of the client applications 119, 121 operating on the client devices 118 and 120 to the one or more backend applications, and/or software platforms, such as a documentation platform or an issue tracking platform. The client devices 118 and 120 may be executing a frontend application 119, 121 that consumes services provided by the content collaboration service 104. Accordingly, a user of a client device 118 or 120 may create, edit, search, and/or view electronic documents, pages, or electronic content using the interface provided by the content collaboration service 104. By way of a non-limiting example, the interface provided by the content collaboration service 104 may be webservice based, such as a REpresentational State Transfer (REST) webservice. The electronic documents, pages, or electronic content may be transferred between a client device and a host server using one or more of JavaScript Object Notation (JSON), EXtensible Markup Language (XML), HyperText Markup Language (HTML), and/or a proprietary document format.

The content collaboration service 104 allows the user to create, edit, search, and/or view electronic documents, pages, or electronic content and may also be referred to herein as a document management service or page management service. The content collaboration service 104 may allow the user to create, edit, search, and/or view electronic documents, pages, or electronic content based on authentication and/or authorization of a user using the authentication/authorization service 106. The authentication/authorization service 106 may authenticate a user based on user credentials, which may include a username or other user identification, password or pin, biometric data, or other user-identifying information. The user credentials may be stored and tracked using a token, authentication cookie, or other similar data element. The authorization service 106 may provide a unified authentication service by verifying access from a permitted user and pairing the verified user with a corresponding user account in one or more of the software platforms. As one non-limiting example, the authorization service 106 may use a shared cookie/scheme to authenticate each user account on each software platform. As another non-limiting example, the authorization service 106 may authenticate users with a single sign-on service (SSO) and/or a two-factor authentication (2FA) service.

Upon successful authentication/authorization of a user, the content collaboration service 104 may access a user profile service 114 to obtain a user profile associated with an authenticated user of a client device. The user profile associated with the user may suggest various permissions of a user for creating, editing, accessing, searching, and/or viewing various electronic documents, pages, or electronic content. The user profile associated with the user may also identify other details of the user, including but not limited to, a role of a user in an organization, one or more groups to which a user is a member, other users of the one or more groups to which the user is a member, one or more projects related to the user, one or more issues or tickets (managed by an issue tracking system) the user is assigned to, and so on. The user profile may include, but is not limited to, user permission settings or profiles, and user history that may include user logs or event histories, system settings, administrator profile settings, document space settings, and other system profile data associated with the backend applications described herein and associated with the user.

Accordingly, the user of the client device may create, edit, access, search, and/or view document space(s), electronic documents, pages, or electronic content based on permissions granted to the user based on the retrieved user profile. The other services 116 described herein may provide a user interface to other applications or services, for example, an issue tracking system, to create, edit, search, or view an issue or ticket on the issue tracking system. Thus, the content collaboration service 104 may generate electronic documents, pages, or electronic content which may also include data associated with one or more issues managed by the issue tracking system.

While the content collaboration service 104 is configured to render electronic documents, pages, or electronic content for display to the user, the content collaboration service 104 may allow the user to create electronic documents, pages, or electronic content in a document space. The user may create a new document space that is based on a particular space type. The particular space type may be selected from multiple space types, which are displayed to the user in the space-generation graphical user interface. However, not all space types from the multiple space types may be related or relevant for the user. Accordingly, the most relevant space types and/or a predetermined number of space types may be presented to the user in the space-generation graphical user interface.

The most relevant space types and/or the predetermined number of space types may be determined by the recommendation service 112. Further, the most relevant space types and/or the predetermined number of space types may be displayed in an order based on a respective ranking for each space type. The ranking for each space type may be determined based on many factors, for example, a role associated with a user account based on the user profile retrieved upon authentication of the user using the authentication service 106, an experience level of the user, a number of electronic documents or pages generated by the user, and so on. For example, a user account may be associated with a particular role, such as a software engineer or developer. Users having the particular role may typically generate electronic documents or pages, which may be related to various engineering documents, and/or research or knowledge-based documents. Accordingly, space types such as a software project space, a knowledge base space, and/or a documentation space may be ranked higher over a team space for a user having an associated role. Further, if the user is an experienced user and/or has created many documents earlier, a different type of space or spaces may be included in the displayed relevant space types and/or predetermined number of space types.

The recommendation service 112 may also develop custom spaces or custom space types based on, for example, user interaction event logs or other records of system use that may indicate the type of work performed by a user associated with a particular user account, group, or tenant. As discussed previously, historical interactions with the system 100, as recorded by user event logs, interaction logs, historical event logs, and other similar data, may be used to select and/or create a space time predicted to be relevant to a particular user account. In some cases, the recommendation service includes one or more machine-learning models that are configured to produce a custom space type in response to receiving data corresponding to a particular user account's historical system use, which may be represented as a multidimensional vector or other data object.

The hosted services 102 may store electronic documents, pages, or electronic content, and data related to document spaces in a local database, memory, or cache otherwise referred to as the content store 108. However, the hosted services 102 may also store and/or access electronic documents, pages, or electronic content and/or data related to document spaces in a remote content store 108 including a remote database, memory, or cache (for example, in a cloud environment). By way of a non-limiting example, electronic documents, pages, or electronic content stored in the content store 108 may be user-generated content, document space data, template pages related to one or more space types, content tree data, content metadata and other electronic content associated with the various backend applications described herein. The user-generated content may be stored as page objects, document objects, or other data elements.

Figure 2A:
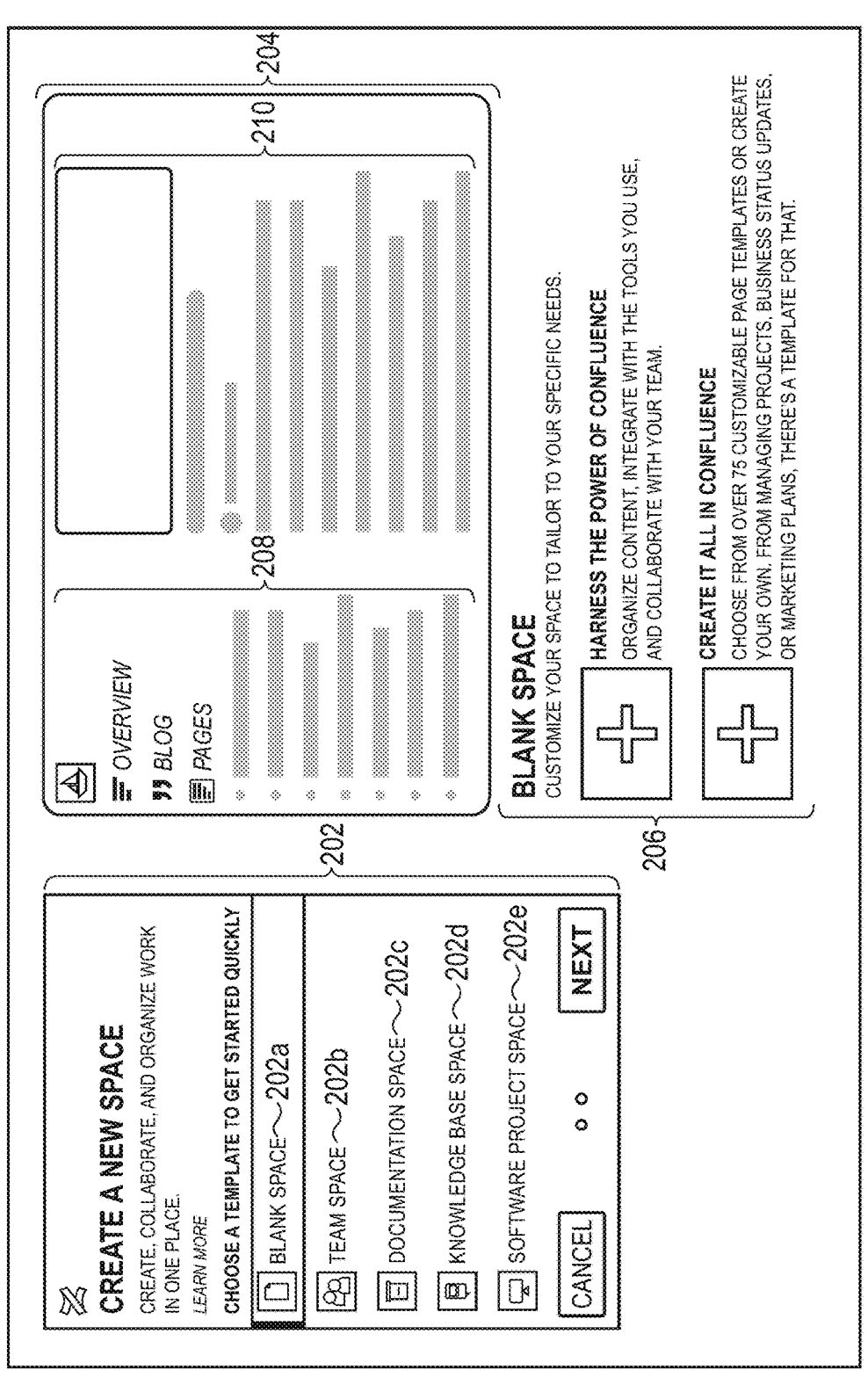
FIGS. 2A-2C depict example views of a frontend application for a new document space creation in accordance with embodiments described herein.
Figure 2B:
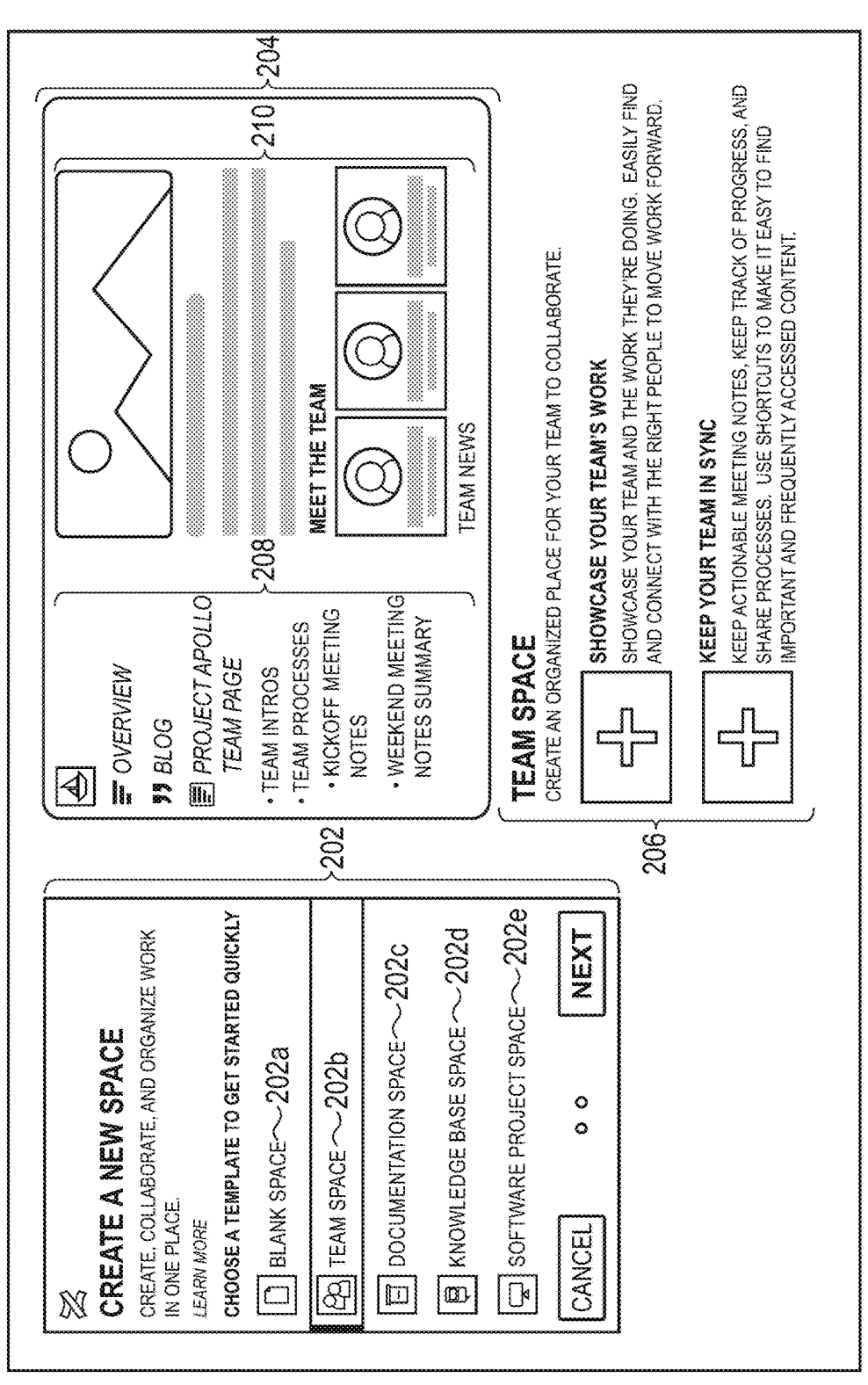
Figure 2C:
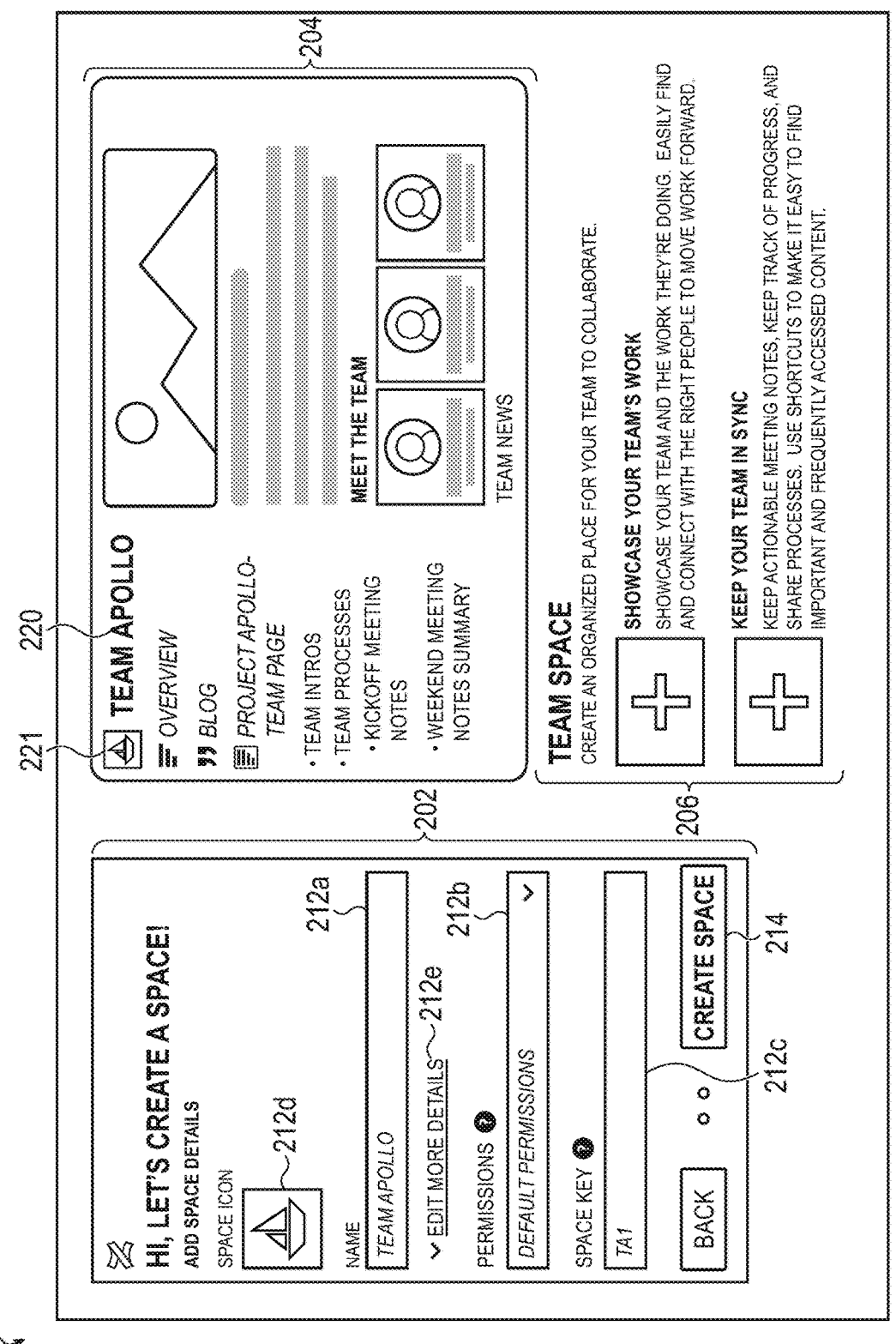

FIGS. 2A-2C depict example views of a frontend application or a frontend application executing on a client device of a user. Various views of a graphical user interface, which are shown in FIGS. 2A-2C as 200a-200c allow a user to create, edit, access, search, and/or view a document space in which the user may create, edit, access, search, and/or view an electronic document, page, or electronic content (referred herein simply as content). Views 200a-200c are views of a space-generation graphical user interface that allows the user to select and customize a new document space using a dynamically updated preview of the space along with user-supplied space content entered through the same interface.

As described in more detail below, the graphical user interface 200a enables a user to customize a new document space from a single interface and without changing contexts, screens, or required to access functionality buried in various menus. The graphical user interface 200a comprises three main components: a user-input region 202, a target image region 204 and a corresponding space-narrative region 206. Using the user-input region 202, the user can provide user input to define the new space in accordance with the planned use case or user need. In response to user input, the target image region 204 and space-narrative region 206 are dynamically updated to reflect the user input and provide an approximation of the proposed new space. Using this dynamically updated information, the user can define different aspects of the new space, change space types, and explore other options and functionality without leaving the graphical user interface 200a and before the new space is actually created.

The space-generation 200a graphical user interface may be displayed on a client device in response to a request to create a new document space. The request to create a new document space may be received from a client device operating a particular frontend application of the content collaboration system that allows a user to create, edit, search, access, and/or view a document space, and create, edit, search, access, and/or view an electronic document, page, or electronic content in a document space. As shown in FIG. 2A, the space-generation graphical user interface 200a may include and/or display a first user input region 202 including an array of user-selectable controls or elements 202a-202e. In this example, the user-selectable controls are an array of user selectable buttons or tabs. Each user-selectable tab of the user-selectable tabs 202a-202e may correspond with a respective space type. Accordingly, based on user selection of a particular user-selectable tab, the creation of a new document space corresponding to the respective space type may be initiated. Further, as described herein, based on the particular selected tab, the user may be guided through or provided information regarding organization of a proposed space, page or document structure, and how the content may be organized for the user to quickly and efficiently define a space in which users can create, collaborate, and organize electronic content.

In the example graphical user interface 200a, a set of user-selectable tabs 202a-202e are shown. In the present example, the space types may include, but are not limited to, a team space type, a documentation space type, a knowledge base space type, a software project space type, a blank space type, and so on. In some implementations the selection of and/or order of the user-selectable tabs may be determined based on a predicted relevance with respect to the user account associated with the user of the client device. Further, the user-selectable tabs 202a-202e may be presented to the user according to a ranking or order. The ranking of the respective space type may be different for different users due to differences in the user profile associated with the user account or differences with the historical system usage for the user or user group. In one example, a role associated with the user account, a group associated with the user account, or previous use history associated with the user account may be used to select and/or order the space types that are presented to the user. Further, in some implementations, a custom or modified space type may be determined in accordance with characteristics or predicted use cases that can be determined based on data associated with a particular user account.

As shown in FIG. 2A, the space-generation graphical user interface 200a may also include or display a target image region 204, and a space-narrative region 206. In the target image region 204, a dynamically updated preview image corresponding to a new space that the user is creating may be displayed. Since the new space is being created based on a space type that corresponds with a user-selectable tab based on the user's input, the preview image may change according to the user-selected tab. The preview image displayed in the target image region 204 may display the overall look of the proposed space and some of the high-level features and organizational schemes of the proposed space. The displayed preview image may also include and/or display space content generated in response to user input provided via the graphical user interface 200a. Example user input includes space titles, space descriptions, space icons or images, and other user input. The space-narrative region 206 may provide information regarding various sections or contents to be added to an electronic document or page based on the particular tab that the user has selected and/or other user input provided to the graphical user interface 200a. Accordingly, content displayed in the space-narrative region 206 may change based in accordance with changes to the target image region 204 and/or input provided to the user input region 202.

The preview image displayed in the target image region 204 may be dynamically updated based on user input in the first user input region 202 and a second user input region 212 (described below using FIG. 2C). The preview image displayed in the target image region may include and/or display a content panel 210, and a navigational panel 208, which mimics the user interface of the space (see e.g., space example user interfaces of FIGS. 3A-3B). The current content for the particular space may be displayed or previewed in the content panel 210, which in this example displays example space overview content. The navigational panel 208 may include and/or display a space overview element, a hierarchical element tree (also referred to as a page tree or document tree), a hierarchical blog tree, and other elements of the space, which are selectable to cause display of their respective content in the content panel 210.

Accordingly, the preview image displayed in the target image region 204, and content displayed in the navigational panel 208 and the content panel 210 may be dynamically updated based on user input and/or based on the user selected tab and its corresponding space type. For example, the preview image displayed in the view 200*a* corresponds with a space type, for example, the blank space type 202*a*. Accordingly, the preview image displayed in the target image region 204 shows in the target image region 204, a navigational panel 208 and a content panel 210 which corresponds with the particular blank space type 202*a*. As shown in the view 200*a*, the navigational panel 208 for the blank space type 202*a* shows a space overview element, a hierarchical element tree, and a hierarchical blog tree. The hierarchical element tree and the hierarchical blog tree may reflect the structure or default organizational scheme for documents, pages, and/or blog entries for the given space type.

FIG. 2B depicts another example view of a frontend application, and in particular, for a space type that corresponds with the team space type 202*b*. As described herein, the preview image displayed in the target image region 204 and the space description region 206 may change according to a particular space type and the user-selected tab. Accordingly, when the user has selected the tab that corresponds with the team space type 202*b*, a preview image corresponding to the team space type 202*b* is displayed in the target image region 204. In some implementations, in response to a user selection of a tab or other user input, the transition between images shown in the target image region 204 is animated to show the changes in a time-dependent sequence of images. Further, as discussed previously, the preview image displayed in the target image region is dynamically updated based on user input in the first user input region 202 and/or second user input region 212 (described below using FIG. 2C).

As shown in FIG. 2B, the preview image shown in the graphical user interface 200*b* corresponding to the team space type 202*b* may display a space overview element, a hierarchical document tree, and a hierarchical blog tree in the navigational panel 208. The space overview element represents a selectable element, corresponding to at least some of the space content of the respective document space, which may be displayed in the content panel 210. The hierarchical element tree displayed in the navigational panel 208 may have a default structure that is determined in accordance with the user selection of the particular selectable tab associated with the particular space type. The default structure may include and/or display one or more pages based on their respective ranking and/or relationship with other pages. In other words, the one or more pages are displayed based on a predefined level of nested hierarchy for the array of tree elements. One or more pages displayed in the hierarchical document tree may be default pages associated with the particular space type.

Similarly, the preview image shown in the view 200*b* corresponding to the selected tab 202*b* associated with the team space type may display current content of the space in the content panel 210. As discussed previously, the current content displayed in the content panel is also dynamically updated based on user input in the first user input region 202 and/or second user input region 212 (described below using FIG. 2C). The content displayed in the content panel 210 of the preview image is based on the particular space type, and accordingly, for the team space type 202*b*, the content displayed in the content panel 210 may include, for example, details of other team members who may have permissions to access the new space and documents in the new space. In some cases, details of the other team members, such as, their profile details, a profile image, contact information, and so on may be dynamically received, updated, and/or displayed in the content panel 210. Similarly, as shown in the view 200*b*, the space description region 206 may provide information regarding various sections or contents to be added to an electronic document or page corresponding to team space type 202*b*. The team members associated with the space may be designated in the input region 202 through a drop down selection control, text box, or other graphical object configured to receive user input. The designated users may be granted default edit permissions and, in some cases, administrator positions for the new document space.

In some cases, the preview image displayed in the target image region 204 and the corresponding space definition may also depend upon a role of the user creating the document space. For example, the structure of the space may change to include a weekly status report or meeting summary page or calendar entries for user accounts associated with a manager role and the space may include default documents formatted for developers with links to code repositories for user accounts associated with a developer or software engineer role. Furthermore, the use role, system use history, or other data associated with the user account can be used to customize the preview image and the corresponding space definition used to create the new space.

FIG. 2C depicts an example graphical user interface 200*c* of the frontend application that corresponds to the previous examples. This example depicts example user input that may be received in order to define the new space, which is also used to modify or adapt the preview image in the target image region 204. The following example is merely one example set of user input that may be received and other user input may be received and used to modify the image and the space in a fashion similar to the example described herein.

Upon selection of a user-selectable tab from the array of user-selectable tabs 202, the user may be presented with the second input region 212 for configuring or creating a new space based on the space type associated with the user-selected tab. The second input region may include a title input field 212*a* for configuring a title or a name for the new space. The user may also select an icon or an image 212*d* for the new space from an image library. The second input region may also include a key region 212*c* in which a unique space key corresponding to the space may be displayed. The key region 212*c* may also accept user input for the unique space key. Typically, the title or the name for the new space based on user input is dynamically displayed in the title input field 212*a*, and also in the key region 212*c* as the unique space key. The selected image 212*d* for the new space is also dynamically displayed in the target image region as 221. Similarly the title of the name for the new space is also dynamically displayed in the target image region as 220. In the case where the space key based on the name or the title of the space already exists for other user-created document space in the content collaboration system, the space key may be automatically updated to resolve a conflict between two space keys, for example, by appending a space key with one or more alphanumeric or numeric characters. Alternatively, a notification or an error message may be displayed to the user, and the user may update the space key to resolve a conflict between two space keys. The suggested space key may be automatically generated by the system and entered into the key region 212*c*, which may be further editable by the user.

The system is configured to generate a default space key that is both based on the user input and unique within the system since the user may provide a space title including a series of alphanumeric or numeric characters in the input field 212*a*. The system may perform a space key check operation to determine if another space has a key that matches the proposed title. If the title text is unique and satisfies other rules and conditions (e.g., contains no spaces or other prohibited characters), the title may be used as the space key. However, if the system determines that the title is not unique in the system or otherwise violates other rules and conditions for the space key, the system may automatically generate the space key by adapting the title text to be unique and also satisfy the rules and conditions. For example, the text may be modified to replace spaces and other prohibited characters with an underscore or dash. The system may also have a scheme for modifying non-unique text including the use of prefixes, acronyms, or modifiers to obtain a unique string. For example, if a document space is created by a user with a name or a title of the document space as "Team Apollo," and the system determines that the text is unique, a space key of the space may be entered as "Team_Apollo" in the appropriate field 212*a* and used to create the space. However, when another user is creating another document space with the same proposed title "Team Apollo," the system may detect the non-unique condition and automatically generate a unique space key by modifying the text. For example, the system may generate a key "TA1," "A1," "Apollo_SF," "Apollo_J_Doe," or other string and cause the generated text to be displayed in the input field 212*a*. In some implementations, the system extracts a first letter of each word to build a base portion of the space key. The system may then generate a character string (e.g., a number or other character) that, when combined with the base portion, results in a unique space key. As discussed previously, the text in the input field 212*a* is user editable and may be further adapted or modified by the user through the interface 200*c*. In response to entry of modified or edited text, the system may automatically re-check the text to determine if it satisfies a uniqueness condition, as well as satisfies other rules and conditions. In response to the modified text not satisfying either the uniqueness or other rules or conditions, the system may generate another proposed space key. In some cases, the system generates an error message or provides another indicia that the proposed space key is not acceptable.

The user may configure and/or edit space settings of the document space. For example, the user may set permissions for the document space using an option 212*b* to update permissions for the document space. The user may also update settings of the document space using an option labeled 212*e*, which may allow the user to update configurations or settings associated with an associated space type of the document space. For example, the user may update settings related to what information regarding other team members may be displayed in the preview image in the content panel. The information regarding the other team members that may be selected and/or controlled for display may include a name of a team member, an email address of the team member, a phone number of the team member, a profile image of the team member, and so on.

The fields or user-interface controls available for user input may depend on the space type that is currently selected. Thus, in response to a user selecting the desired space type, one or more additional user input regions may be displayed having input controls that are adapted for that particular space type. In some cases, the system may also extract information from the user's user profile, or from the content store to pre-populate the various fields, which may be editable by the user. For example, for spaces that may include additional users or team members, the system may identify teams or groups associated with the user, either in the content store for the content collaboration platform or in the content store for another platform like an issue tracking platform. In some cases, the system may also analyze user event logs or other system data to generate default text for one or more of the fields or regions of the user input regions. In some cases, a machine learning trained model is used to determine predicted default inputs based on the user account that has been authenticated or is otherwise associated with the client device.

In some implementations, the content displayed in the image depicted in the target image region 204 is also user editable and may cause changes to the corresponding text input fields of the user input region 212. For example, the title, space, icon, or other space content depicted in the target image region 204 may be user editable through the interface 200*c* causing the default values for the space to change, which may also be reflected in the appropriate text input fields of the interface 200*c*.

Further, in the second user input region 212, a space-creation control 214 may also be displayed. In response to a user input or user selection of the space-creation control 214, a backend application of the content collaboration system may generate a new document space corresponding to a space type based on the selected user-selectable tab. The new document space is generated having the title or the name for the new document space as provided or configured by the user by providing input in the second user input region 212.

Figure 3A:
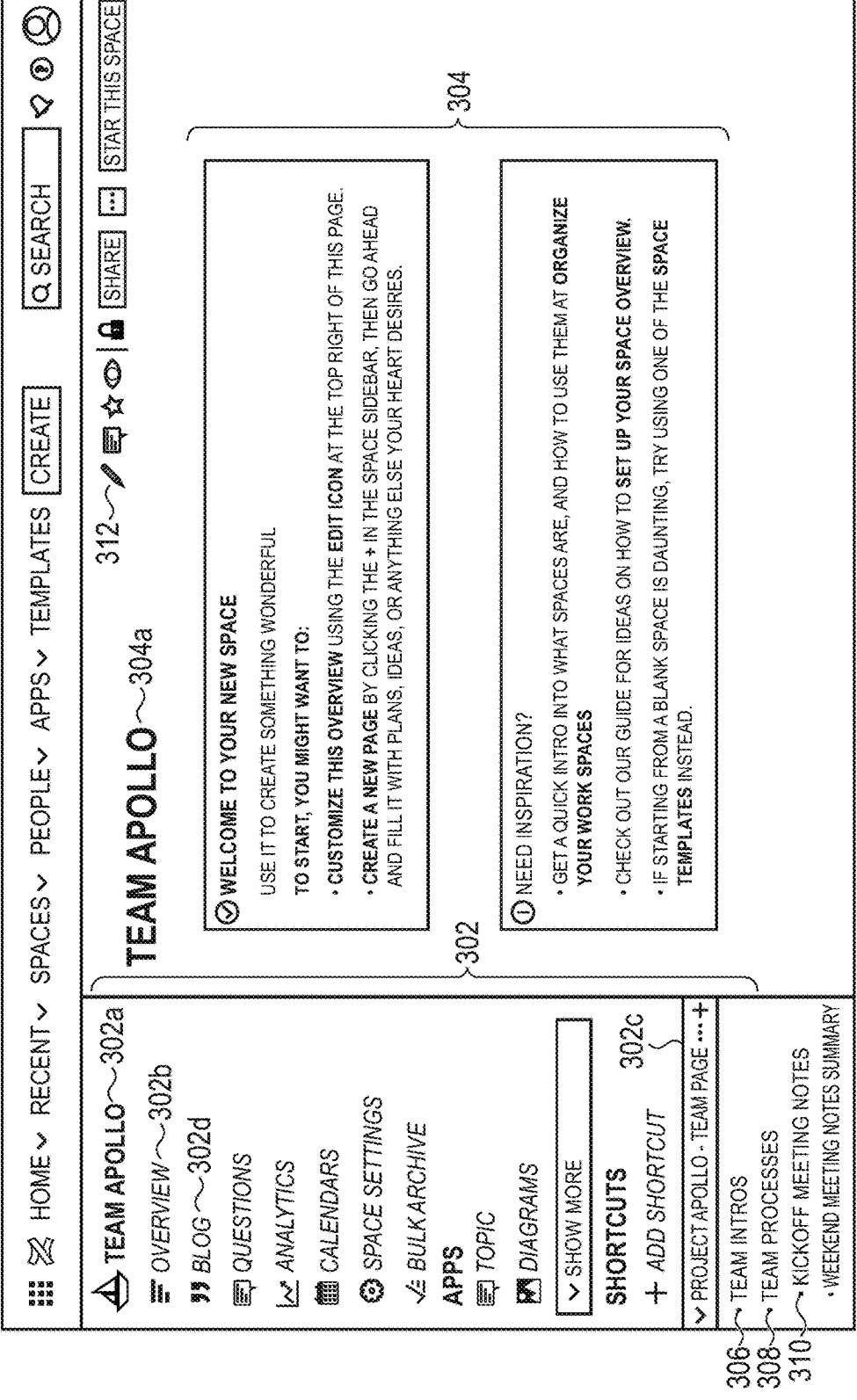
FIGS. 3A-3B depict example views of a frontend application displaying a structure of a document space in accordance with embodiments described herein.
Figure 3B:
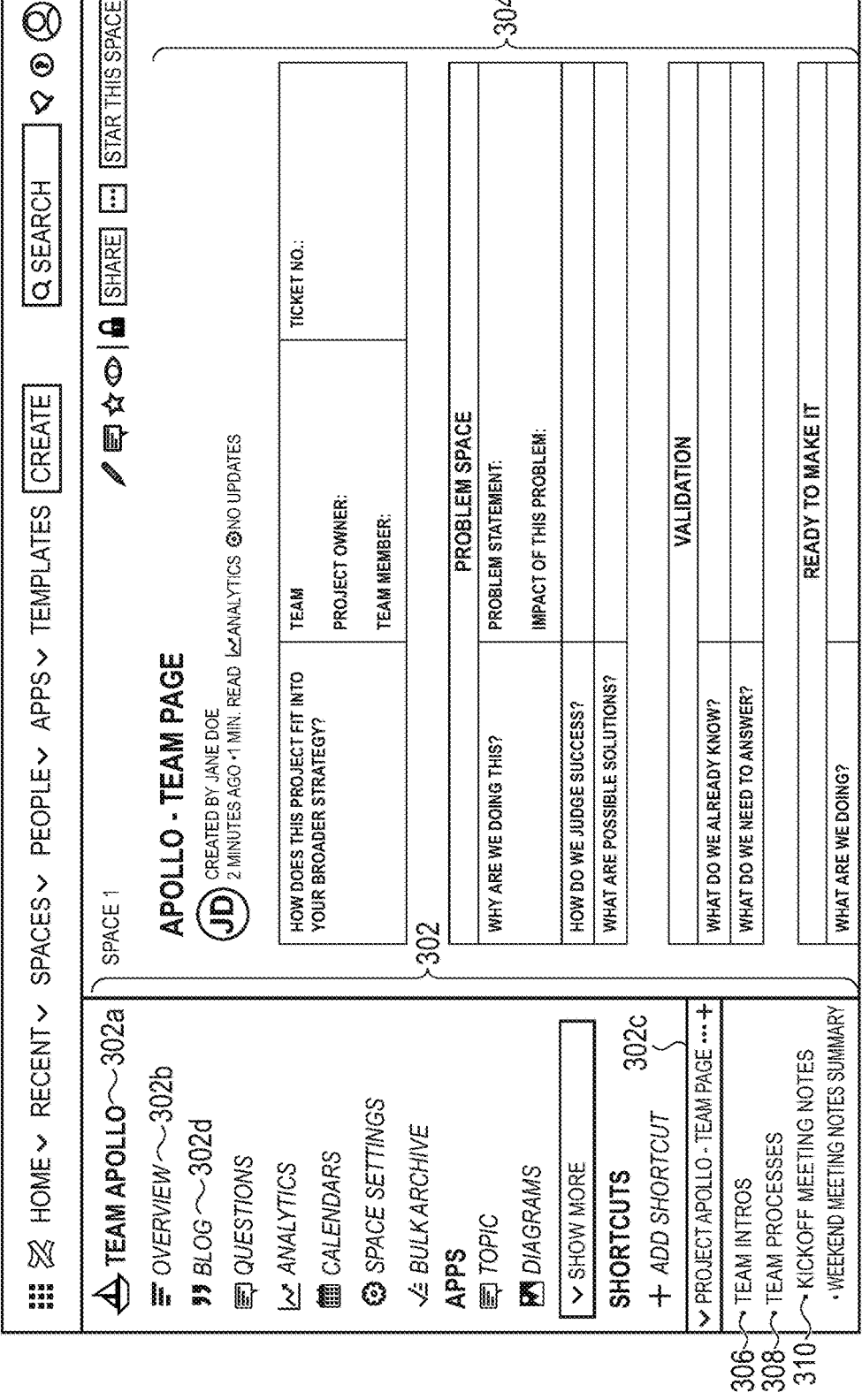

FIGS. 3A-3B depict example views of a frontend application displaying a structure of a document space in accordance with embodiments described herein. The graphical user interface 300*a* of the front end may represent the new space created by a user using the techniques described herein. The graphical user interface 300*a* includes a view of a new space created in the content collaboration platform or system and includes default content and predetermined file structures generated in accordance with the selected space type and the user input received during the space creation process.

The view 300*a* displays a navigational panel 302 and a content panel 304 of a user-created space with a title or a name of a space as "Team Apollo," which is displayed in both the navigational panel 302 as the space element 302*a* and the content panel 304 in the space overview content 304*a*. The space-generation graphical user interface 300*a* also includes, in an address bar of the browser, a full path to the document space (e.g., a URL address) which is generated by the system based on the unique space key defined in the space-generation operations. For example, the space key for the document space shown in the view 300*a* may be "TA1," which forms a portion of a path to the newly created document space.

As described herein, the navigational panel 302 may include a space overview element 302*b*, which is a selectable element. Accordingly, based on user selection at the space overview element 302*b*, a corresponding content, e.g., content related to the overview of the new document space "Team Apollo," may be displayed in the content panel 304. In accordance with an authenticated user having at least view permissions for the space, selection of a corresponding element in the navigational panel 302 will cause display of the respective content in the content panel 304. The user may be able to navigate between different spaces using the "spaces" control positioned in the main upper menu bar.

In accordance with a user having at least edit permissions with respect to the space, the use may select edit control 312, which toggles the graphical user interface 300a from a view mode to an edit mode. When in an edit mode, the graphical user interface 300a allows the user to generate content using an editor or editable field that is co-extensive with the content panel 304. Using the editor, the user can generate text content, images, video, and/or audio content (multimedia content), insert links to other services or platforms of the hosted services which may be displayed as embedded content, insert links to third party content, and generate tables, graphs, or other similar content. Having edit or admin permissions with respect to the space allows the user to generate content in a similar fashion for pages, documents, blog posts, calendar entries, or other content having selectable elements displayed in the navigational panel 302. Accordingly, a user designated as having edit or admin permissions allows the user to generate new content, edit existing content, archive saved content, or delete space content. Other system users may also be granted similar permissions, as designated in the space permissions settings, which may be defined during the space creation process described herein. Further, within the space, each document, page, blog entry, or other object of the space may have separate permissions schemes that specify viewing and edit permissions with respect to a designated set of users. In some cases, the set of designated users includes the public, which means that the content may be viewable (or in some cases editable) by the public.

Subsequent to generating or editing content using the graphical user interface 300a, the authenticated user may either publish the content (allowing authorized viewers to view the content) or may save the draft for future editing or publishing activities. Saved drafts may only be viewable to users having admin permissions for the space or edit or author permissions with respect to the saved draft. In some cases, the saved draft has a corresponding element that is displayed in the navigational panel 302 for users having appropriate permissions. Once the content is published, the content may be viewable by users having at least view permissions and the content may be accessed via a respective path entered into the browser. Additionally, the space may allow in-line comments to be added by users having the appropriate permissions and/or add trailing comments to the content in a designated comment region of the space, document, page, or blog.

As shown in FIG. 3A, the navigational panel 302 includes a hierarchical document tree 302c (also referred to herein as a hierarchical element tree, document tree, or page tree) and a hierarchical blog tree 302d, each including one or more documents and one or more blog articles, respectively. Each document in the hierarchical document tree 302c, and/or each blog article in the hierarchical blog tree 302d may be a selectable element, and may cause a corresponding content being displayed in the content panel 304 based on user's input at an element of the hierarchical document tree 302c and/or the hierarchical blog tree 302d.

As shown in the graphical user interface 300a of FIG. 3A, the new space includes other objects that are automatically generated in response to generating the new space. As shown in FIG. 3A, the new space may be pre-populated with default pages, blog document or entries, and a space calendar (as shown in the navigational panel 302). The structural relationship of these objects and the default content and/or templates used to generate the documents in the space may be generated or determined in accordance with the space type selected during the space generation process, described herein. For example, the hierarchical document tree 302c and the hierarchical blog tree 302d may be expandable and/or collapsible. The hierarchical document tree 302c in an expanded state may display one or more pages according to a default structure in which pages are displayed based on a predefined level of nested hierarchy for each document (or a tree element) of the document tree. In some cases, the space content is further adapted or generated in accordance with property of or data associated with the user account generating the new space. For example, a role, group, or other property of the user account, may be used to define the default settings and content of the new space. Similarly, prior use history, user interaction events, or other data associated with the user account may also be used to define or modify the default settings and content of the new space.

By way of example, with respect to blog object, the content and default structure of the blog document entries may depend on the space type alone or in addition to the user account properties discussed herein. In general, a blog entry created by a user is assigned a position in a hierarchical blog tree having an array of blog elements. The blog entry created by the user may also be assigned an element of the array of blog elements shown in the navigational panel. As discussed previously, each element of the array of blog elements is selectable in response to a user input (for example, a user selecting indicated by a click, a double click, a tap, a double tap, etc.) thereby causing content of the blog to be displayed in the content panel 304 of the graphical user interface 300a. The hierarchical blog tree may group or structure the blog posts based on the space type. For example, a document space having a "team space" space type may define default blog folders or entries for each team member or for team leaders. For a document space having a "knowledge base" space type, the blog entries may be blank and/or the blog element shown in the navigational panel 304 may be suppressed from display. Additionally, for a document space having a "knowledge base" space type, the hierarchical element tree or page tree may include a structure that reflects a topic-based or subject-based structure in which documents directed to high level topics are placed in a first hierarchical order of documents and more documents directed to more detailed or sub-topic subject matter are placed in a second or subsequent hierarchical order of documents.

FIG. 3B depicts an example view 300b corresponding to a viewing and/or editing of particular documents or pages of the space. As described previously, the content and/or arrangement of default documents and content may be generated in accordance with a space type and/or data associated with a user account. For example, the hierarchical arrangement of documents, document templates, document content, and document permissions may be automatically generated in response to a selection of a particular space type and/or data associated with a user account.

FIG. 3B depicts an example page structure and example page content associated with a newly created space. The default document or page structure is evidenced by the hierarchical element tree 302c, also referred to herein as a page tree or document tree. As shown in the graphical user interface 300b, the hierarchical element tree 302c is expandable, and in an expanded view, may display one or more pages based on their predefined level of nested hierarchy (or relationship with other pages). For example, a first page element 306 may be automatically generated along with dependent or child page 308 and sibling page 310, each page having a hierarchical relationship to the other pages in the space. Thus, the hierarchical element tree 302*c* may provide a template or default structure that may be modified or edited by the user.

Each page may also be generated with default content that may be selected or generated in accordance with the space type. For example, as shown in FIG. 3B, the new space may be automatically populated with documents generated in accordance with the space type, which in this example includes content adapted for use with a team space type. As shown in the content panel 304, the content associated with the first page element 306 includes a team home page template having automatically generated content including titles, headings, tables and other document sections that can be adapted for use by the user. By providing default structure and content in the default or template pages or documents, a more consistent level of documentation may be developed across a team and across an organization. Further, the default organization and content may suggest functionality and content options to the user that would ordinarily be available but buried within menus or other aspects of the user interface.

As described with respect to other examples within, an authenticated user, having at least edit permissions, may select an edit control from the graphical user interface 300*b*, which toggles the graphical user interface 300*b* from a view or viewer mode to an edit or editor mode. In the editor mode, the user may create, edit, delete, or otherwise modify the page content by interacting with the editable region in the content panel 304. In some cases, when the graphical user interface 300*b* is toggled into the editor or edit mode, display of the navigational panel 302 is suppressed and the content panel 304 is shown in full-screen mode. As described previously, once a user has completed editing activity, the page may be published to a designated set of users or may be saved as a draft for later review and/or editing activities. Unpublished drafts may only be visible to users having space admin permissions, edit permissions, and/or author permissions for the particular page.

Figure 4A:
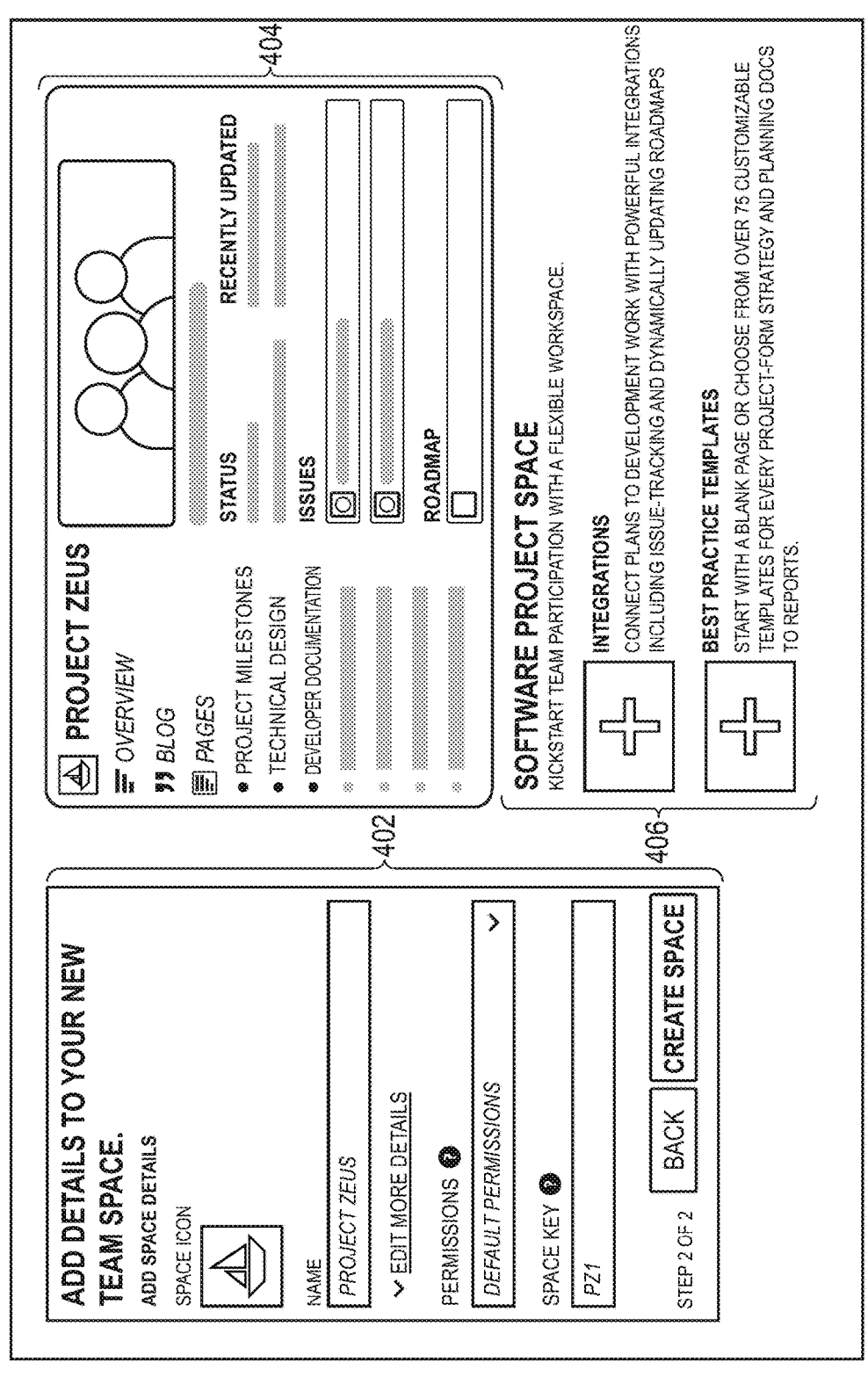
FIGS. 4A-4B depict example views of a frontend application displaying a structure of another document space in accordance with embodiments described herein.
Figure 4B:
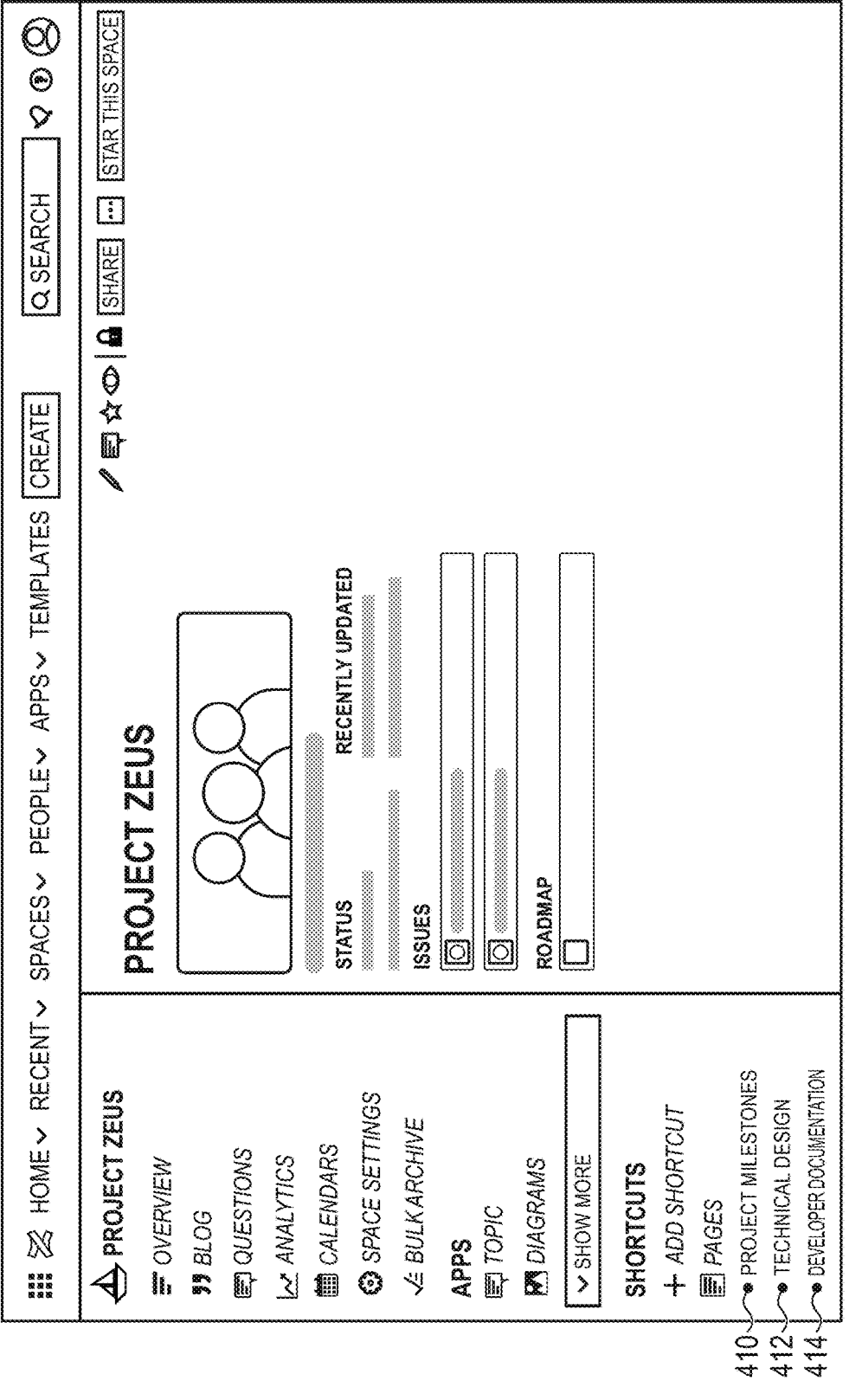

FIGS. 4A-4B depict example views of a frontend application displaying a structure of another document space in accordance with embodiments described herein. For example, views 400*a* and 400*b* shown in FIGS. 4A and 4B correspond with a document space of a software project space type. The view 400*a* shows a second user input region 402, which may be similar to the second user input region 212 described above. However, the target image region 404 may display a preview image that corresponds with a particular space type, which in this case is the software project space type. The preview image displayed in the target image region corresponds with the particular space type, which in this case is the software project space type. Similar to the previous examples described herein, the preview image is dynamically updated and displayed based on the user input provided to a corresponding user input region and/or data associated with a user account including prior use history, user role, or other data.

Also similar to previous examples, the space narrative region 406 in the view is dynamically updated based on the particular space type of the document space. For example, the space narrative region 406 for the software project space type may display information regarding other tools or applications that may be relevant to a user creating new document space of the software project space type. Specifically, placeholders for issues or tickets managed by an issue tracking system, a source code management system, or other system or platform may be included in the new space, as described in the space narrative region 406. Further, the new space may include one or more integrations with other systems or platforms in accordance with the description provided in the space narrative region 406.

FIG. 4B shows a graphical user interface 400*b* in which content of a page of a hierarchical document tree associated with the software project space type is automatically generated. As described previously, corresponding to each space type, one or more default pages may be provided and displayed in a navigational panel in a hierarchical document tree. As shown in the view 400*b*, a hierarchical document tree 408 may include one or more default page elements 410, 412, 414, each selectable to display a corresponding page or page content in the content panel. Specifically, a page element 410 may be selectable to display a corresponding page titled "Project milestones," which may be automatically generated in accordance with a selection of the software project space type. As described with respect to previous examples, each page or tree element of the hierarchical document tree is a selectable element, and based on the user's selection at the element 410, content of the corresponding page may be displayed in the content panel 404. As shown, the content of the page may include details about various projects and/or issues assigned to the user. The page may also include links to data objects, such as issues or tickets, that are managed by a separate issue tracking system. The page and/or the space may also include one or more integrations with a separate system like the issue tracking system, which may enable data to be automatically passed between the two systems or platforms in accordance with a rule set or script executing an advanced programming interface (API) or other inter-platform communication scheme. In some cases, the issues or other objects that are linked to or integrated with the new space are designated through the interface of FIG. 4A or may be selected by the system based on data associated with the user account.

Figure 5:
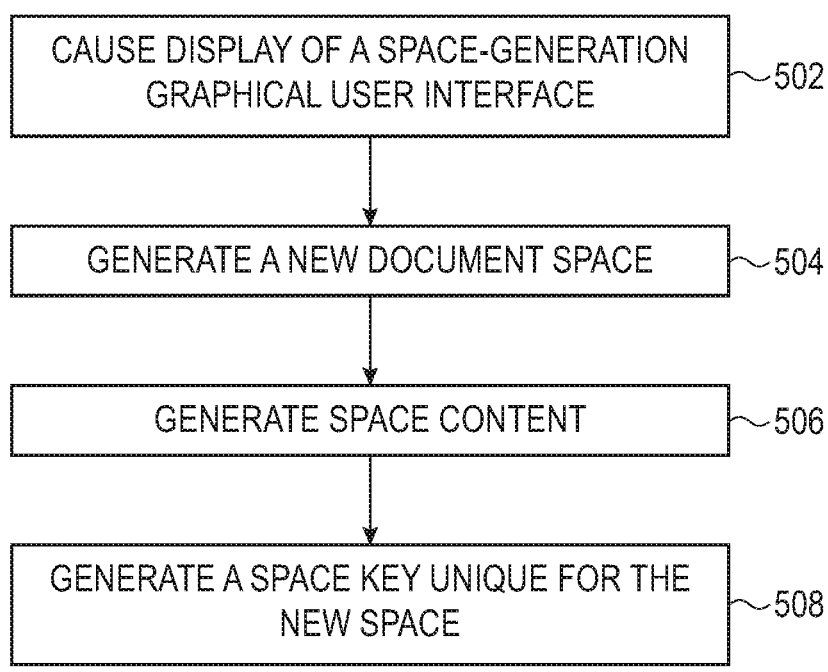
FIG. 5 depicts an example flow-chart of a process for a new document space creation in accordance with embodiments described herein.

FIG. 5 depicts an example flow-chart of a process for a new document space creation in accordance with embodiments described herein. As shown in a flow-chart 500, at 502, a request may be received by a content collaboration system from a frontend application executing on a client device to create a new document space. As described herein, the request may be received by a content collaboration service of a hosted services backend or platform via a network. In response to the received request, a user associated with the frontend application executing on the client device may be authenticated, and upon determining that the user has permissions to create and/or edit a document space, a space-generation graphical user interface may be displayed on the client device.

The space-generation graphical user interface may allow the user to select a space type for the new document space. The space type may be selected by selecting a control (e.g., a tab) from an array of user-selectable tabs displayed in a first user input region. Each tab of the array of user-selectable tabs may be associated with a particular space type. As described herein, various space types may be a blank space type, a team space type, a documentation space type, a knowledge base space type, a software project space type, and so on.

The space-generation graphical user interface may also allow the user to provide or configure a title or a name for the new space. The user may provide the title or the name of the new space in the title input field displayed in the second user input region. A key region, which may be within the second user input region, may allow the user to configure a unique space key for the new space.

In response to a user selecting a space-creation control option to create a new space, a backend application of the content collaboration system may generate a new document space, at 504. The new document space is generated having a set of predefined space settings in accordance with the user selection of a particular selectable tab associated with a particular space type for the new document space. The set of predefined space setting may also include configurations or settings updated by the user.

At 506, space content may be generated including and/or displaying the title or the name of new document space. As described herein, the title or the name of the new document space as provided or configured by a user is displayed in the navigational panel and/or the content panel. Additionally, a series of pages or documents having default or template content may also be generated in accordance with the selected space type. In some cases, links to other system objects or integrations with other software platforms like an issue tracking platform or a source code management platform may also be automatically generated for the new space.

At 508, a unique space key for the new document space may be generated, as described herein. The space key for the new document space may be generated based on the title or the name of the new document space. In cases where the space key for the new document space conflicts with a space key for another document space, the space key may be uniquely generated, for example, by appending a series of alphanumeric or numeric characters to the space key based on the title or the name of the document space. Other schemes for generating a unique space key may also be used. The space key may be used to access the new document space by the frontend application, as described herein.

Figure 6:
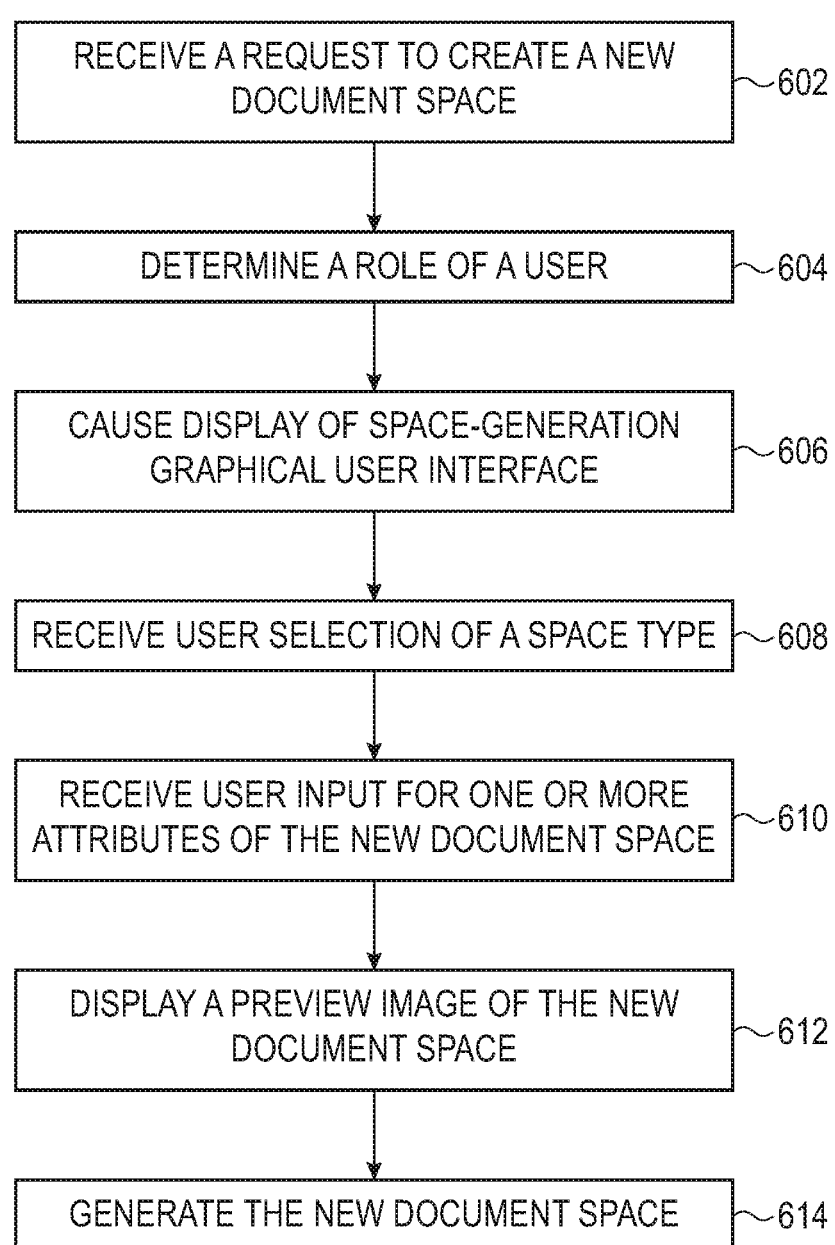
FIG. 6 depicts another example flow-chart of a process for a new document space creation in accordance with embodiments described herein.

FIG. 6 depicts another example flow-chart of a process for a new document space creation in accordance with embodiments described herein. As shown in a flow-chart 600, at 602, a request may be received by a content collaboration system from a frontend application executing on a client device to create a new document space. As described herein, the request may be received by a content collaboration service on a hosted services backend or platform via a network. In response to the received request, at 604, a user associated with the frontend application executing on the client device may be authenticated, and a user profile associated with the user may be retrieved. Based on the user profile, a user's role may be determined. At 606, a space-generation graphical user interface may be displayed on the client device. The displayed space-generation graphical user interface may include an array of user-selectable controls (e.g., user-selectable tabs). Each user-selectable tab of the array of user-selectable tabs is associated with a particular space type, and may be used to specify a space type for the new document space. Accordingly, at 608, a user selection of a particular user-selectable tab of the array of user-selectable tabs may be received identifying a particular space type for the new document space.

At 610, user inputs corresponding to one or more attributes of the new document space may be received. For example, the user input corresponding to the one or more attributes of the new document space may be a title or a name of the new document space, a space key for the new document space, a permissions settings for the new document space, and so on. At 612, a preview image corresponding to the new document space may be displayed in a target image region of the space-generation graphical user interface. And at 614, the new document space may be created having a set of predefined space settings. The set of predefined space settings may include the user input to the one or more attributes of the new document space.

Figure 7:
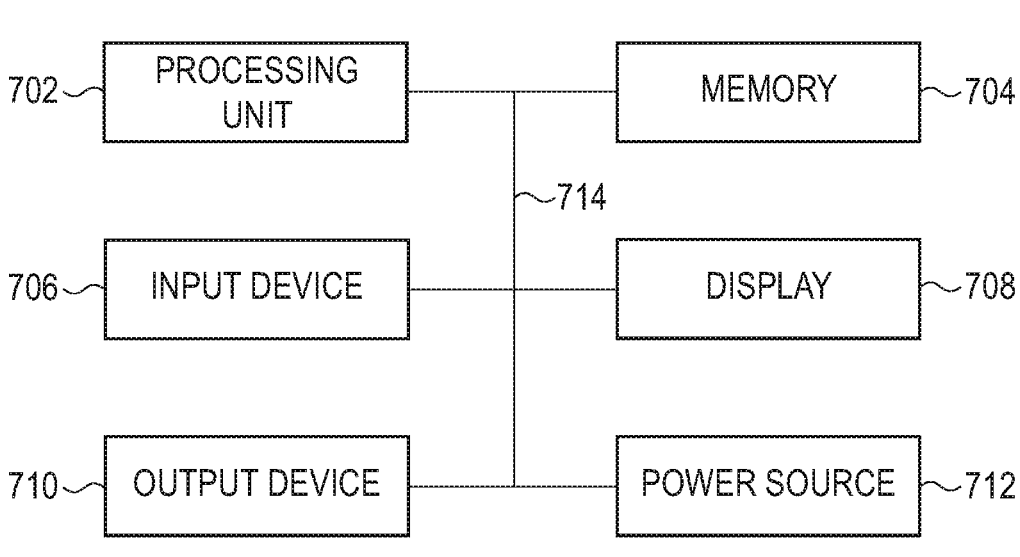
FIG. 7 depicts an example hardware for devices of the systems described herein.

FIG. 7 shows a sample electrical block diagram of an electronic device 700 that may perform the operations described herein. The electronic device 700 may in some cases take the form of any of the electronic devices described with reference to FIGS. 1-4D, including client devices, and/or servers or other computing devices associated with the collaboration system 100. The electronic device 700 can include one or more of a processing unit 702, a memory 704 or storage device, input devices 706, a display 708, output devices 710, and a power source 712. In some cases, various implementations of the electronic device 700 may lack some or all of these components and/or include additional or alternative components.

The processing unit 702 can control some or all of the operations of the electronic device 700. The processing unit 702 can communicate, either directly or indirectly, with some or all of the components of the electronic device 700. For example, a system bus or other communication mechanism 714 can provide communication between the processing unit 702, the power source 712, the memory 704, the input device(s) 706, and the output device(s) 710.

The processing unit 702 can be implemented as any electronic device capable of processing, receiving, or transmitting data or instructions. For example, the processing unit 702 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 700 can be controlled by multiple processing units. For example, select components of the electronic device 700 (e.g., an input device 706) may be controlled by a first processing unit and other components of the electronic device 700 (e.g., the display 708) may be controlled by a second processing unit, where the first and second processing units may or may not be in communication with each other.

The power source 712 can be implemented with any device capable of providing energy to the electronic device 700. For example, the power source 712 may be one or more batteries or rechargeable batteries. Additionally or alternatively, the power source 712 can be a power connector or power cord that connects the electronic device 700 to another power source, such as a wall outlet.

The memory 704 can store electronic data that can be used by the electronic device 700. For example, the memory 704 can store electronic data or content such as, for example, audio and video files, documents and applications, device settings and user preferences, timing signals, control signals, and data structures or databases. The memory 704 can be configured as any type of memory. By way of example only, the memory 704 can be implemented as random access memory, read-only memory, Flash memory, removable memory, other types of storage elements, or combinations of such devices.

In various embodiments, the display 708 provides a graphical output, for example associated with an operating system, user interface, and/or applications of the electronic device 700 (e.g., a chat user interface, an issue-tracking user interface, an issue-discovery user interface, etc.). In one embodiment, the display 708 includes one or more sensors and is configured as a touch-sensitive (e.g., single-touch, multi-touch) and/or force-sensitive display to receive inputs from a user. For example, the display 708 may be integrated with a touch sensor (e.g., a capacitive touch sensor) and/or a force sensor to provide a touch- and/or force-sensitive display. The display 708 is operably coupled to the processing unit 702 of the electronic device 700.

The display 708 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 708 is positioned beneath and viewable through a cover that forms at least a portion of an enclosure of the electronic device 700.

In various embodiments, the input devices 706 may include any suitable components for detecting inputs. Examples of input devices 706 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 706 may be configured to detect one or more particular types of input and provide a signal (e.g., an input signal) corresponding to the detected input. The signal may be provided, for example, to the processing unit 702.

As discussed above, in some cases, the input device(s) 706 include a touch sensor (e.g., a capacitive touch sensor) integrated with the display 708 to provide a touch-sensitive display. Similarly, in some cases, the input device(s) 706 include a force sensor (e.g., a capacitive force sensor) integrated with the display 708 to provide a force-sensitive display.

The output devices 710 may include any suitable components for providing outputs. Examples of output devices 710 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 710 may be configured to receive one or more signals (e.g., an output signal provided by the processing unit 702) and provide an output corresponding to the signal.

In some cases, input devices 706 and output devices 710 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 702 may be operably coupled to the input devices 706 and the output devices 710. The processing unit 702 may be adapted to exchange signals with the input devices 706 and the output devices 710. For example, the processing unit 702 may receive an input signal from an input device 706 that corresponds to an input detected by the input device 706. The processing unit 702 may interpret the received input signal to determine whether to provide and/or change one or more outputs in response to the input signal. The processing unit 702 may then send an output signal to one or more of the output devices 710, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for creating a new document space for a content collaboration system, the method comprising:
    receiving a request to create the new document space from a client device operating a frontend application;
    in response to receiving the request to create the new document space, causing display of a space-generation graphical user interface comprising:
    a first user input region comprising an array of user-selectable tabs, each user-selectable tab corresponding to a new-space type;
    a target image region depicting a preview image corresponding to a first space type corresponding to a first user-selectable tab of the array of user-selectable tabs, the preview image depicting a preview of first space content and a proposed space title, the preview image comprising:
        a first preview navigational panel comprising a first preview document tree having a first plurality of preview documents arranged hierarchically, the first plurality of preview documents unique to the first space type; and
        a first preview content panel corresponding to the first space content; and
    a first space-narrative region separate from the target image region and responsive to user inputs received at the first user input region, the first space-narrative region comprising a first description, based on the first user-selectable tab, of:
        first proposed content to be added to one or more of a first set of space-specific documents corresponding to the first plurality of preview documents in response to selection of a space-creation control; and
        one or more first regions of the space-generation graphical user interface to be added to the one or more of the first set of first space-specific documents in response to selection of the space-creation control;
    receiving, at the first user input region, a user selection of a second user-selectable tab of the array of user-selectable tabs corresponding to a second space type;
    in accordance with selecting the second user-selectable tab, updating display of the space-generation graphical user interface, the updated space-generation graphical user interface comprising:

a second preview navigational panel displayed in place of the first preview navigational panel, the second preview navigational panel comprising a second preview document tree having a second plurality of preview documents different from the first plurality of preview documents, the second plurality of preview documents arranged hierarchically;
    a second preview content panel displayed in place of the first preview content panel, the second preview content panel depicting second space content different from the first space content; and
    a second space-narrative region displayed in place of the first space-narrative region, and separate from the target image region and responsive to user inputs received at the first user input region, the second space-narrative region comprising a second description different than the first description, based on the selection of the second user-selectable tab, of:
        second proposed content to be added to one or more of a second set of space-specific documents in response selection of the space-creation control, the second proposed content displayed in response to the selection of the second user-selectable tab; and
        one or more second regions of the space-generation graphical user interface to be added to the one or more of the second set of space-specific documents in response to selection of the space-creation control;
    receiving user input corresponding to selection of the space-creation control; and
    in response to the user input corresponding to selection of the space-creation control, a backend application of the content collaboration system is configured to:
        generate the second set of space-specific documents in accordance with the user selection of the second space type at the first user input region, the second set of space-specific documents corresponding to the second plurality of preview documents and including content displayed in the second space-narrative region, each space-specific document of the second set of space-specific documents comprising:
        a respective document title; and
        pre-populated document content arranged in accordance with a particular space type; and
        generate the new document space, the new document space comprising a hierarchical document tree including an array of hierarchically arranged elements each element of the hierarchical document tree corresponding to a respective space-specific document of the second set of space-specific documents and selectable to cause display of respective document content within a content panel of the new document space.

2. The computer-implemented method of claim 1, wherein:
    the new document space comprises:
    the content panel; and
    a navigational panel depicting:
        a space overview element selectable to cause display of the second space content in the content panel; and
        a hierarchical blog tree having an array of blog elements, each blog element selectable to cause display of a respective blog post in the content panel, the array of blog elements configured according to a permissions profile.

3. The computer-implemented method of claim 1, wherein:

the backend application is configured to authenticate a user of the client device with respect to a user account of the content collaboration system;

in response to the request to create the new document space, the backend application is configured to identify a role associated with the user account; and the array of user-selectable tabs and respective preview images are determined in accordance with the identified role associated with the user account.

4. The computer-implemented method of claim 3, wherein:

the array of user-selectable tabs are displayed in a ranked order; and the ranked order is determined based, at least in part, on the identified role associated with the user account.

5. The computer-implemented method of claim 1, wherein:

the backend application is configured to identify a group of user accounts associated with a user account; and a permissions scheme specifies access permissions for the group of user accounts.

6. The computer-implemented method of claim 1, wherein:

the space-generation graphical user interface further comprises a key region depicting a unique space key derived from the proposed space title;

the unique space key depicted in the key region is dynamically updated in response to a change to the proposed space title; and the unique space key depicted in the key region is editable in response to input received at the client device.

7. A computer-implemented method for creating a new document space for a content collaboration system, the method comprising:

causing display of a space-generation graphical user interface of a frontend application operating on a client device, the space-generation graphical user interface comprising:

a first user input region comprising a set of user-selectable tabs, each user-selectable tab corresponding to a new-space type of a plurality of predefined space types;

a target image region depicting a preview image corresponding to a first space type corresponding to a first user-selectable tab of the set of user-selectable tabs, the preview image depicting a preview of first space content and a proposed space title, the preview image comprising:

a first preview navigational panel comprising a first preview document tree having a first plurality of preview documents arranged hierarchically, the first plurality of preview documents unique to the first space type; and a first preview content panel corresponding to the first space content; and a first space-narrative region separate from the target image region and responsive to user inputs received at the first user input region, the first space-narrative region comprising a first description, corresponding to the first user-selectable tab, of:

first proposed content to be added to one or more of a first set of space-specific documents corresponding to the first plurality of preview documents in response to selection of a space-creation control; and one or more first regions of the space-generation graphical user interface to be added to the one or more of the first set of first space-specific documents in response to selection of the space-creation control;

receiving, at the first user input region, a user selection of a second user-selectable tab of the set of user-selectable tabs corresponding to a second space type;

in accordance with selecting the second user-selectable tab, updating display of the space-generation graphical user interface, the updated space-generation graphical user interface comprising:

a second preview navigational panel displayed in place of the first preview navigational panel, the second preview navigational panel comprising a second preview document tree having a second plurality of preview documents different from the first plurality of preview documents, the second plurality of preview documents arranged hierarchically;

a second preview content panel displayed in place of the first preview content panel, the second preview content panel depicting second space content different from the first space content; and a second space-narrative region displayed in place of the first space-narrative region, and separate from the target image region and responsive to user inputs received at the first user input region, the second space-narrative region comprising a second description different than the first description, based on the second user-selected tab, of:

second proposed content to be added to one or more of a second set of space-specific documents in response selection of the space-creation control, the second proposed content displayed in response to the selection of the second user-selectable tab; and one or more second regions of the space-generation graphical user interface to be added to the one or more of the second set of space-specific documents in response to selection of the space-creation control;

receiving user input corresponding to selection of the space-creation control; and in response to the user input corresponding to selection of the space-creation control, a backend application of the content collaboration system is configured to:

generate the second set of space-specific documents in accordance with the user selection of the second space type at the first user input region, the second set of space-specific documents corresponding to the second plurality of preview documents and including content displayed in the second space-narrative region, each space-specific document of the second set of space-specific documents comprising:

a respective document title; and pre-populated document content arranged in accordance with a particular space type; and generate the new document space, the new document space comprising a hierarchical document tree including an array of hierarchically arranged elements, each element of the hierarchical document tree corresponding to a respective space-specific document of the second set of space-specific documents and selectable to cause display of respective document content within a content panel of the new document space.

8. The computer-implemented method of claim 7, wherein:

the space-generation graphical user interface further comprises a key region depicting a unique space key;

the unique space key is generated by the backend application in response to entry of the proposed space title; and the key region is configured to receive user input to modify the unique space key.

9. The computer-implemented method of claim 7, wherein:

the space-generation graphical user interface further comprises a second user input region comprising a title input field configured to receive the proposed space title;

in response to user-entered text being entered into the second user input region, the backend application is configured to determine if the user-entered text is unique with respect to existing space keys; and in response to the user-entered text being not unique with respect to the existing space keys, the frontend application is configured to display an error message.

10. The computer-implemented method of claim 7, wherein:

the backend application is configured to authenticate a user of the client device with respect to a user account of the content collaboration system; and the backend application is configured to select the set of user-selectable tabs based on a role associated with the user account.

11. The computer-implemented method of claim 7, wherein:

the backend application is configured to authenticate a user of the client device with respect to a user account of the content collaboration system; and the backend application is configured to select an order of the set of user-selectable tabs based on a role associated with the user account.

12. The computer-implemented method of claim 7, wherein:

the new document space comprises:

the content panel; and a navigational panel depicting:

a space overview element selectable to cause display of the second space content in the content panel.

13. The computer-implemented method of claim 12, wherein the second space content includes default text formatted in accordance with a type of the new document space.

14. A computer-implemented method for creating a new document space for a content collaboration system, the method comprising:

receiving a request to create the new document space from a client device operating a frontend application;

causing display of a space-generation graphical user interface including an array of user-selectable tabs, each user-selectable tab of the array of user-selectable tabs associated with a particular space type;

receiving a user selection of a first user-selectable tab of the array of user-selectable tabs corresponding to a first space type;

displaying:

a preview image corresponding to the first space type in a target image region of the space-generation graphical user interface, the preview image depicting a preview of first space content and comprising:

a first preview navigational panel comprising a first preview document tree having a first plurality of preview documents arranged hierarchically, the first plurality of preview documents unique to the first space type; and a first preview content panel corresponding to the first space content; and a first space-narrative region separate from the target image region, the first space-narrative region comprising a first description, corresponding to the first user-selectable tab, of:

first proposed content to be added to one or more of a first set of space- specific documents corresponding to the first plurality of preview documents in response to selection of a space-creation control; and one or more first regions of the space-generation graphical user interface to be added to the one or more of the first set of first space-specific documents in response to selection of the space-creation control;

receiving a user selection of a second user-selectable tab of the array of user-selectable tabs corresponding to a second space type;

in accordance with selecting the second user-selectable tab, updating display of the space-generation graphical user interface, the updated space-generation graphical user interface comprising:

a second preview navigational panel displayed in place of the first preview navigational panel, the second preview navigational panel comprising a second preview document tree having a second plurality of preview documents different from the first plurality of preview documents, the second plurality of preview documents arranged hierarchically;

a second preview content panel displayed in place of the first preview content panel, the second preview content panel depicting second space content different from the first space content; and a second space-narrative region displayed in place of the first space-narrative region, and separate from the target image region, the second space-narrative region comprising a second description different than the first description, based on the user selection of the second user-selected tab, of:

second proposed content to be added to one or more of a second set of space-specific documents in response selection of the space-creation control, the second proposed content displayed in response to the selection of the second user-selectable tab; and one or more second regions of the space-generation graphical user interface to be added to the one or more of the second set of space-specific documents in response to selection of the space-creation control;

receiving user input corresponding to selection of the space-creation control; and in response to the user input corresponding to selection of the space-creation control:

generating the new document space having the second set of space-specific documents, the second set of space-specific documents corresponding to the second plurality of preview documents and including content displayed in the second space-narrative region, each space-specific document of the second set of space specific documents comprising:

a respective document title; and pre-populated document content arranged in accordance with a particular space type; and generating a hierarchical document tree including an array of hierarchically arranged elements, each element of the hierarchical document tree corresponding to a respective space-specific document of the second set of space-specific documents and selectable to cause display of respective document content within a content panel of the new document space.

15. The computer-implemented method of claim 14, wherein each user-selectable tab of the array of user-selectable tabs is ranked and displayed based on a respective rank of each user-selectable tab of the array of user-selectable tabs.

16. The computer-implemented method of claim 14, wherein the new document space comprises a title of the new document space.

17. The computer-implemented method of claim 16, further comprising:

generating a space key associated with the new document space based on the title of the new document space;

verifying the space key associated with the new document space is a unique space key; and in response to the verification identifying the space key is not a unique space key, displaying a notification to a user to correct the space key to generate a unique space key associated with the new document space.

\* \* \* \* \*